United States Patent Office 2,829,269
Patented Apr. 1, 1958

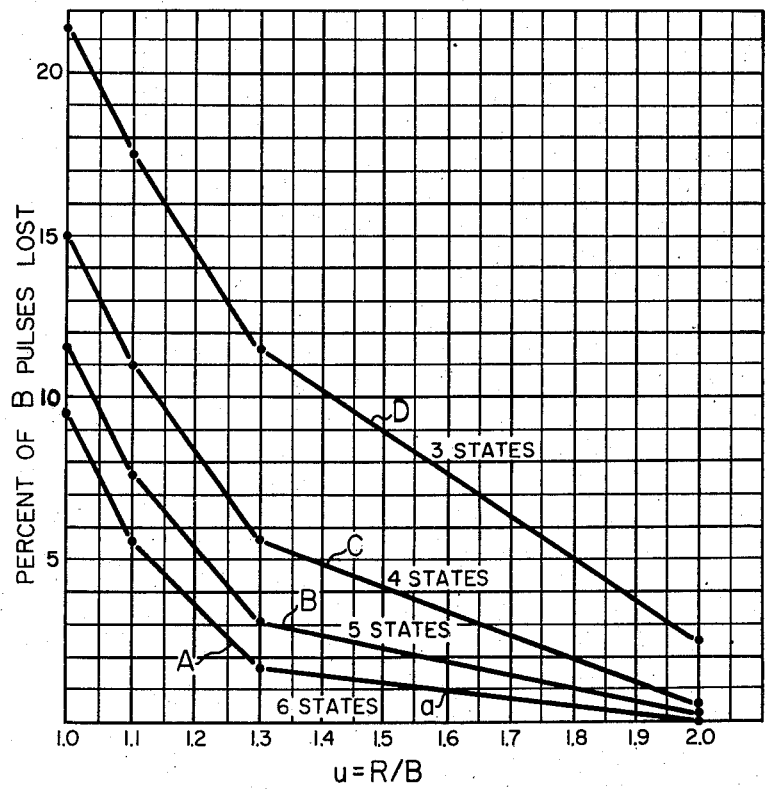
FIG. 1
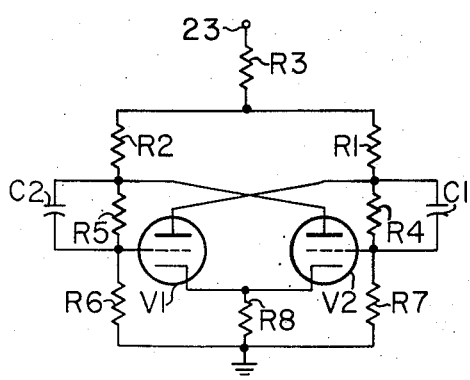
FIG. 4
| STATE | STAGE | | |
|---|---|---|---|
| | I | II | III |
| 5 | 0 | 0 | 0 |
| 4 | 1 | 0 | 0 |
| 3 | 0 | 1 | 0 |
| 2 | 1 | 1 | 0 |
| 1 | 0 | 1 | 1 |
| 0 | 1 | 1 | 1 |
FIG. 5
INVENTORS
WENDELL C. PEACOCK
GARRET F. ZIFFER
BY
ATTORNEY

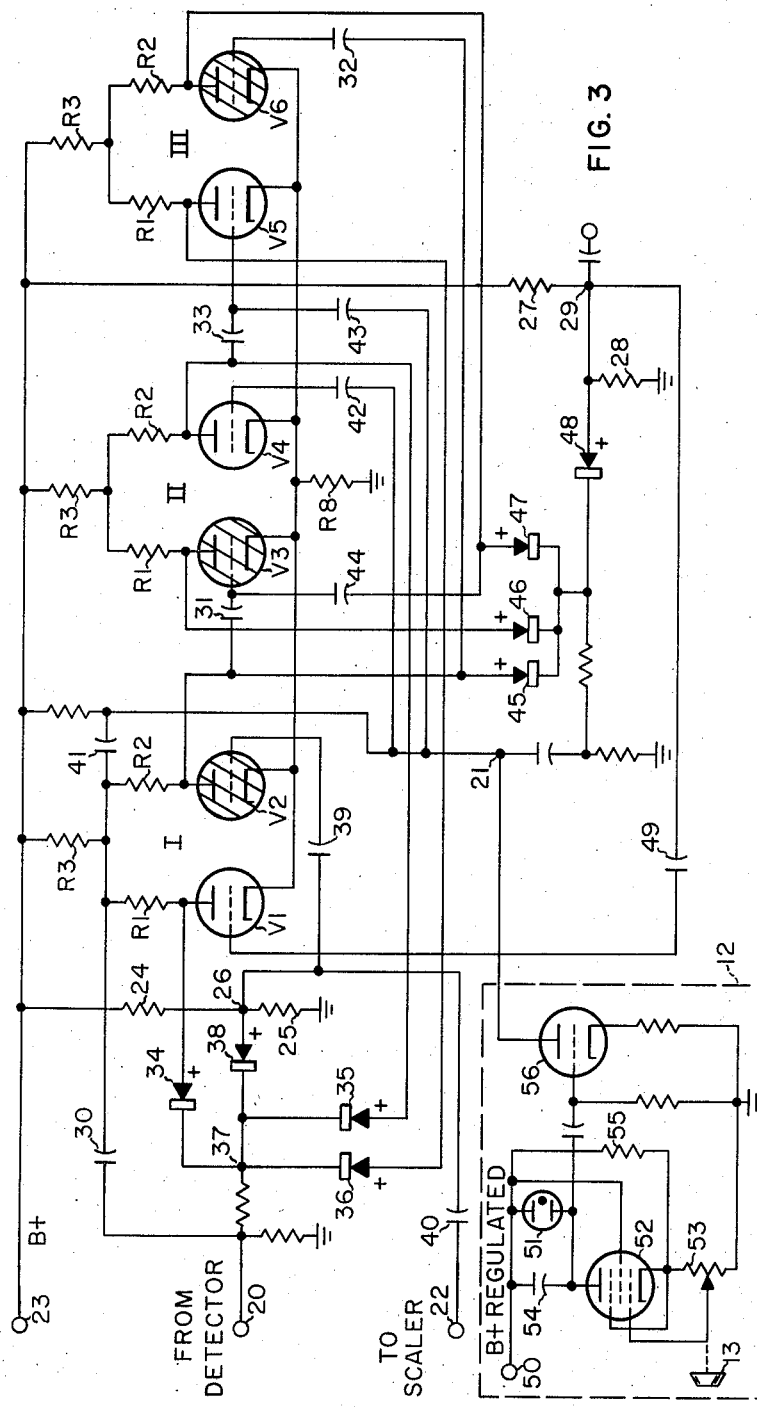
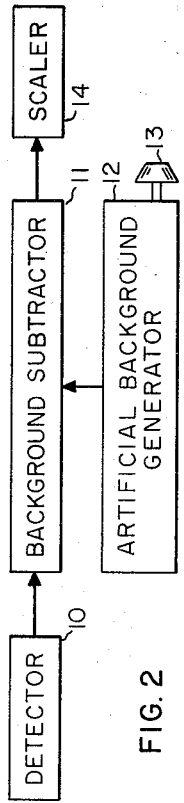

2,829,269

PULSE COUNTING CIRCUIT

Wendell C. Peacock, Dover, and Garret F. Ziffer, Cambridge, Mass., assignors to Tracerlab, Inc., Boston, Mass., a corporation of Massachusetts Application November 13, 1953, Serial No. 391,988

20 Claims. (Cl. 250—83.6)

This invention relates to electronic counting circuits, and more particularly to a circuit for use in connection with the counting of nuclear disintegrations whereby the counts corresponding to "background" radiation are automatically subtracted from the indicated count.

In the analysis of radioactive sources, especially where a quantitative measure of the activity is desired, it is customary to detect the individual disintegration events with a suitable detector, such as a Geiger tube, a scintillation detector or the like, which produces an electrical pulse for each event. These pulses are fed into a scaler or counting circuit, of which several types are available, for indicating the number of pulses received during a predetermined time, or the time required for the receipt of a predetermined number of pulses. Nuclear disintegrations being random and independent events, the indicated count of the scaler is subject to statistical variations. Even though the average counting rate is constant, the actual counting rate in any particular interval of time will vary from the average, the variation from average being less when a large number of events are counted than when the number is small. A convenient measure of statistical error is the "probable error" which has been defined as that error which is as likely to be exceeded as not, and may be expressed $$\text{Percent probable error} = \frac{67.45}{\sqrt{N}}$$

where N is the total number of events or counts. Assuming that the "probable error" can be reduced to a tolerable limit by counting a sufficient number of events, consideration must also be given to the counts contributed by background radiation which occurs in the absence of the source to be analyzed due to cosmic rays, slightly radioactive material in the counting area, or radioactive contamination of the material of the detector itself. When the background counting rate is low, e. g., a tenth or less of the total counting rate, the actual counting rate attributable to the source (or total count in a given interval of time) may be obtained by subtracting the background rate (separately measured) from the total indicated count. For larger background ratios, the error introduced is greater and eventually, if the ratio of background to total counts becomes large enough, will limit the useful sensitivity of the scaler. By proper shielding and handling of radioactive material it is possible to minimize background radiation, but normally there is still some background that for practical purposes is unavoidable. Fortunately, although also statistical in nature, the average background counting rate in a given area can often be considered as being substantially constant over extended periods. Heretofore, a background check has been made prior to performing a number of assays, and the background count arithmetically subtracted from the total count, as indicated by the scaler, to obtain the actual activity of the source under analysis. This method is tedious, inconvenient and obviously subject to human errors.

A primary object of the present invention is to provide means for deriving a net average pulse rate equal to the difference between the average pulse rates of two sources of pulses.

Another object of the present invention is to provide means for deriving a net average pulse rate equal to the difference between the average pulse rates of two sources of randomly distributed pulses.

Another object of the present invention is to provide means for deriving a net average pulse rate equal to the difference between the average pulse rates of two sources of pulses, one of which produces randomly distributed pulses and the other of which produces equally spaced pulses.

A more specific object of the invention is to provide means for deriving a net average pulse rate equal to the difference between the average pulse rate of the output of a radiation detector and the average pulse rate of background radiation in the counting area.

A further object of the invention is to provide means for use in combination with a radiation detector and a scaling circuit for generating a series of spaced pulses corresponding to the average background counting rate of the detector, and means for deriving for application to the scaler a net average pulse rate equal to the difference between the average pulse rate of the output of the detector and the pulse rate of said spaced pulses.

Still another object of the invention is to provide means for connection between a radiation detector and a scaling circuit of the type used in making radioassays for automatically subtracting from the pulse output of the detector a number of pulses corresponding to the background of the detector whereby a net count indicative of the activity of the sample being assayed is applied to the scaling circuit.

In the attainment of the foregoing objects the invention contemplates, in its most general sense, an electronic register to which pulses from two sources are applied, the register being effective to automatically subtract the pulses from one source from the pulses from the other source. In a more specific sense, the invention contemplates an electronic register connected between a radiation detector and a scaling circuit, and a pulse generator for producing evenly spaced pulses at an average rate corresponding to the background of the detector, the register being effective to subtract the latter pulses from the output of the detector thereby to provide for application to the scaling circuit, an average pulse rate indicative of the activity of the sample being analyzed. The instant register was specifically developed for the latter application, and although in no way limited to this arrangement the invention is conveniently described with relation thereto.

Without describing the electronic register in detail, the problem encountered, the requirements of the register to satisfy statistical variations, and the general function of the register will now be discussed. In general, the instant invention comprises a register of "memory" circuit capable of storing a predetermined number of bits of information, and a pulse generator for generating equally spaced pulses at an average rate corresponding to the average background rate in the locale under consideration. The output of a suitable radiation detector, e. g., Geiger tube, scintillation detector, or the like, together with the artificially generated background pulse are applied to the register. For convenience, the pulses from the radiation detector will hereinafter be designated R pulses, and the synthetic background pulses will be designated B pulses. Thus, the pulse generator produces suitable pulses, B, of a constant frequency $1/T_B$, which are fed into the register, which for purposes of illustration will be considered as having six states, designated 0, 1, 2, 3, 4 and 5, respectively. Random pulses, R, from the radiation detector are also fed into the same six-state register at an average rate R. The circuit is so arranged that successive B pulses in the absence of R pulses, cause the register to advance from state 0 to state 1 to state 2, to state 3 to state 4 to state 5, at which state further B pulses have no effect on the circuit, leaving the sysem in state 5 and preventing the recording of B pulses on the scaler. Successive R pulses, in the absence of B pulses, reverse the conduction states of the circuit from state 5 to state 4 to state 3 to state 2 to state 1 to state 0, R pulses entering the system while in state 0 being passed on to the scaler and recorded. The system, therefore, effectively subtracts the background counting rate, when the B rate is adjusted to the independently measured background rate of the detector, and the scaler records only the net count.

The register having a finite number of states, is limited in its ability accurately to subtract all background counts; e. g., if a B pulse enters the system when the latter is in state 5 it is not "remembered" and accordingly, is not available to cancel an R pulse later applied to the circuit, thus allowing a certain number of R pulses to be counted that should not be. Thus, an error in net count may be expected, the magnitude of which, in most cases, is not objectionable, as will be seen from the following statistical analysis.

At any time in the operation of the system after equilibrium is established, there is a certain probability $f_0$ that the system is in state 0, a certain probability $f_1$ that the system is in state 1, and similarly for $f_2$, $f_3$, $f_4$ and $f_5$, and if the B and R pulse rates do not change, these $f$'s will remain the same throughout a counting run. Since the system is constrained, in the present example, to be in one of the six states, $$f_0+f_1+f_2+f_3+f_4+f_5=1 \quad (1)$$

Now, denoting as $A_{12}$ the probability of state 1 changing so that at a time exactly $T_B$ later it is in state 2, then $A_{11}$ will be the probability of it being in state 1 at the end of the period $T_B$, $A_{13}$ will be the probability of it being in state 3 at the end of $T_B$, etc. Choosing an initial beginning and ending immediately after a B pulse so that $f_0=0$, the following expressions can be written:

$$A_{11}f_1+A_{21}f_2+A_{31}f_3+A_{41}f_4+A_{51}f_5=f_1 \quad (2)$$

$$A_{12}f_1+A_{22}f_2+A_{32}f_3+A_{42}f_4+A_{52}f_5=f_2 \quad (3)$$

$$A_{13}f_1+A_{23}f_2+A_{33}f_3+A_{43}f_4+A_{53}f_5=f_3 \quad (4)$$

$$A_{14}f_1+A_{24}f_2+A_{34}f_3+A_{44}f_4+A_{54}f_5=f_4 \quad (5)$$

$$A_{15}f_1+A_{25}f_2+A_{35}f_3+A_{45}f_4+A_{55}f_5=f_5 \quad (6)$$

The foregoing Equations 2 through 6 express the fact that after a time $T_B$, the probability of the system finding itself in a given state is equal to the probability, first of it starting in each of the six states times the probability of it making the required transition. These equations also express the fact that the $f$'s are the same after the time $T_B$. If the A quantities in the above equations are expressed numerically and the equations solved for $f_5$, the probability of no R pulses arriving in time $T_B$ times $f_5$, then, is the probability of a B pulse being lost during the time $T_B$ and is expressed:

$$P=f_5 p_0(u) \quad (7)$$

where P is the probability of a B pulse being lost in a time $T_B$, and $p_0(u)$ is the probability of exactly zero R pulses occurring during a time such that the true average number of pulses is $u$. As is well known (see for example, Introduction to the Theory of Probability and Statistics, Niels Arley and K. Rander Buch, John Wiley and Sons, Inc., 1950), the formula expressing the occurrence of random events is:

$$p_n=p_n(u)=\frac{u^n e^{-u}}{n!}$$

where $p_n$ is the probability of exactly $n$ pulses occurring in a time such that on the average $u$ events (pulses in this case) occur in such a time interval. For convenience, a quantity $q_n$ will be here defined as the probability, $$q_n=1-\sum_{i=0}^{n-1} p_i$$

of $n$ or more events (R pulses) occurring during such a time interval that the average number of events is $u$.

Rewriting the foregoing Equations 2 through 6, substituting for the A's, $$q_1 f_1+q_2 f_2+q_3 f_3+q_4 f_4+q_5 f_5=f_1 \quad (8)$$

$$p_0 f_1+p_1 f_2+p_2 f_3+p_3 f_4+p_4 f_5=f_2 \quad (9)$$

$$0 \cdot f_1+p_0 f_2+p_1 f_3+p_2 f_4+p_3 f_5=f_3 \quad (10)$$

$$0 \cdot f_1+0 \cdot f_2+p_0 f_3+p_1 f_4+p_2 f_5=f_4 \quad (11)$$

$$0 \cdot f_1+0 \cdot f_2+0 \cdot f_3+p_0 f_4+(p_1+p_0)f_5=f_5 \quad (12)$$

If Equation 7 is solved for in simultaneous Equations 1 and 8 through 12, it can readily be shown that $$P=f_5 p_0=\frac{p_0}{1+C_4\{1+C_3[1+C_2(1+C_1)]\}}$$

where:

$$C_4=\frac{1-p_1-p_0}{p_0}$$

$$C_3=\frac{1-p_1-\dfrac{p_2}{C_4}}{p_0}$$

$$C_2=\frac{1-p_1-\dfrac{p_2}{C_3}-\dfrac{p_3}{C_3 C_4}}{p_0}$$

$$C_1=\frac{1-p_1-\dfrac{p_2}{C_2}-\dfrac{p_3}{C_2 C_3}-\dfrac{p_4}{C_2 C_3 C_4}}{p_0}$$

Stated simply, P of Equation 7 is the fraction of B pulses that is lost in the system and unavailable for subtraction from incoming R pulses, due to the limitations on the "memory" of the system. Attention is directed to the plot of Fig. 1 which shows the percentage of B pulses that is lost for various values of $u=R/B$. Curve A of the plot indicates the B pulses lost in a six state system of the type outlined above (and which will be described in detail hereinafter), curve B indicates the B pulses lost in a five state system, curve C indicates the B pulses lost in a four state system, and curve D indicates the B pulses lost in a three state system. It will be readily apparent that the accuracy of the subtracting circuit falls off rapidly as the number of states (memory capacity) is reduced.

The significance of this plot will be explained in connection with curve A, which is representative of the expected accuracy of the preferred embodiment of the invention to be described hereinafter. Supposing that $u=R/B=1.6$, e. g., $R=160$ counts/minute (which is the sum of the counts contributed by the sample under test and the actual background of the counter) and $B=100$ counts/minute (artificial background counts corresponding to the independently determined background count), then the net count due to the sample is only 60 counts/min., or less than the background. Under this condition (point $a$), the plot indicates that only 1% of the B pulses are lost in the system (i. e., one B pulse in the example given) so that the scaler connected to the output of the subtractor would count 61 counts/min. instead of 60 as it should. As the ratio $R/B$ is increased to 2, i. e., with the background rate equal to the counting rate of the sample under test, the B pulses lost are negligible, and the scaler may be expected accurately to indicate the actual counts contributed by the sample being assayed. At lower sample activities, i. e., where the background rate is considerably in excess of the activity of the sample, the error increases appreciably, and when $R=B$, i. e., the detector is producing only background pulses, about 9.5% of the B pulses are lost, whereby the scaler indicates a net count corresponding to 9.5% of background whereas no pulses are produced by the sample. Radioassaying is rarely done under conditions where the background is much in excess of the activity of the sample so that the system is extremely accurate for the counting problems which are normally encountered. It is to be emphasized that the curves of Fig. 1 are for the case where the B pulses occur at a constant frequency and the R pulses are randomly distributed. By similar statistical analysis, substantially similar curves can be obtained for the case where both the R and B pulses are randomly distributed. The latter condition would exist should an actual "background" count be made simultaneously with the radioassay, and the random pulses thus obtained subtracted from the total count, and is intended to be within the scope of the present invention.

In a preferred embodiment, the invention contemplates in combination with a radiation detector and a scaler, an electronic register including a plurality of interconnected bistable stages providing a plurality of distinct states, to which the output of the detector and synthetic B pulses are applied. The register is arranged to be advanced by one state at a time one after the other in response to B pulses until the system arrives at a predetermined state at which the system is insensitive to further B pulses, and to be reversed by pulses from the detector one state at a time one after the other until the system arrives at a second predetermined state at which time additional R pulses produce no change in state of the register but are transmitted pulse for pulse to the scaler. As was shown above, a circuit having six distinct states provides an accuracy adequate for most counting problems, and the invention will be illustrated in that form.

The invention will be more clearly understood, and other objects, features, and advantages thereof will become apparent from the following detailed description of a preferred embodiment taken in conjunction with the accompanying drawings in which:

Fig. 1 is a plot of a family of curves used hereinabove in describing the accuracy of the circuit of the invention and to which further reference will not be made;

Fig. 2 is a block diagram illustrating the manner in which the invention is used with a radiation detector and scaler;

Fig. 3 is a circuit diagram of a preferred embodiment of the invention;

Fig. 4 is a circuit diagram of a bistable circuit of the type used in the circuit of Fig. 3, and Fig. 5 is a chart useful in describing the sequence of operation of the circuit of Fig. 3.

As was noted earlier, radioactivity measurement is normally accomplished by a suitable pulse producing detector such as a Geiger tube or scintillation detector, the output of which after suitable amplification is applied to a scaling circuit which electronically counts the pulses applied thereto and displays the measured count on a suitable indicator. The recorded count is the total of that contributed by the sample being assayed and the "background" count. After a counting run is made the "background" count, separately determined, is subtracted from the total count to provide a net count which is a measure of the activity of the sample. In accordance with the present invention as diagrammatically illustrated in Fig. 2, the output of detector 10 which includes "background" is applied to the background subtractor 11 of the present invention to which is also supplied from artificial background generator 12 a series of pulses corresponding to the average background count in the area, previously determined by an independent counting run. Background generator 12 is provided with control means (to be described later) which may be actuated by knob 13 to permit adjustment of the repetition rate of the artificial background pulses to correspond with the measured background over a wide range of values. The circuit 11 which will be described in detail in connection with Fig. 3 is operable to subtract from the counts received from detector 10 a number of counts corresponding to the artificially generated background rate whereby the net pulses applied to the scaler 14 correspond to the counts attributable to the sample under investigation.

Referring to Fig. 3, the background subtractor generally comprises three bistable circuits designated stages I, II, and III to which radiation pulses from a suitable detector are applied at point 20 and from which the net count is derived at terminal 22.

For the sake of clarity of the drawing, the bistable circuits have been illustrated without the usual cross connections between the grid of one tube and the plate of the other. All of the stages are identical, each being of the form shown in Fig. 4 comprising a pair of triodes designated V1 and V2. The anode of V1 is connected to the anode of V2 through a pair of series connected resistors R1 and R2, the junction of which is connected to a suitable source of positive potential at terminal 23 through resistor R3. The cathodes of the tubes V1 and V2 are connected through common cathode resistor R8 to ground. The anode of tube V1 is cross-connected to the control grid of V2 through resistor R4 in parallel with capacitor C1 and the anode of V2 is similarly cross-connected to the control grid of V1 through resistor R5 in parallel with capacitor C2. The control grids of tubes V1 and V2 are additionally respectively connected through resistors R6 and R7 to ground.

To distinguish the tubes of the three stages of Fig. 3, they are respectively designated V1 and V2, V3 and V4, and V5 and V6, similar resistors and capacitors in the three stages being identically designated and correspond with the designations used in the description of Fig. 4.

The operation of trigger circuits of the type described is well-known and will be only briefly described. Each trigger stage has two stable conditions, alternately assumed, designated herein as the "0" and "1" conditions. The trigger stages are considered for purposes of the following description as being in their "0" condition when the shaded tubes, i. e., V2, V3 and V6 are conducting and the remaining tubes are non-conducting, and in the "1" condition when tubes V1, V4 and V5 are conducting and the remaining tubes are non-conducting. The conductivity of stage I is switched from one state to the other by the application of suitable negative pulses to the junction of resistors R1 and R2, and stages II and III are switched from one condition to the other by application of suitable negative triggering pulses to the grids of their tubes in a manner which will be described hereinafter.

It will be appreciated that when each bistable circuit is in the "0" condition the anodes of tubes V2, V3 and V6 are at a relatively low potential and when each stage is in the "1" condition the anodes of the other tubes, i. e., V1, V4 and V5 are at a relatively low potential. A voltage divider comprising resistors 24 and 25 connected between terminal 23 and ground establishes a potential at point 26 which is approximately halfway between the conducting and non-conducting potential of any one of the anodes of the tubes of the bistable circuits, and a second voltage divider comprising resistors 27 and 28 connected between terminal 23 and ground establishes a similar potential at point 29. The significance of these potentials at points 26 and 29 will become apparent as the description of the circuit proceeds.

For proper operation, the bistable circuits are so biased that a non-conducting tube is sufficiently cut-off that differentiated positive-going pulses applied to the tube from another stage have insufficient amplitude to trigger it to the conducting condition. Thus, switching of the bistable circuits from one condition to the other is accomplished only by negative pulses.

Before describing the operation of the circuit in detail, it will be advantageous to outline the functional requirements of the circuit and the necessary sequence of operation to produce the desired results. Referring to the chart of Fig. 5, and employing the state designtaions used hereinabove, assume that each stage is initially in its "0" condition as shown in state 5; that is, when the circuit is in state 5, each stage is in the "0" condition with the shaded tubes conducting. It will be shown that each succeeding radiation pulse applied to terminal 20 reverses the "count" by one state until state 0 is reached at which position each additional input pulse at terminal 20 produces an output pulse at terminal 22. Succeeding radiation pulses do not produce a state change, however, and the system remains in state 0 until a background pulse is received at point 21 at which time the circuit retraces its sequence of operation to state 1 then to state 2 upon receipt of a second background pulse, and so on, until at state 5 the circuit becomes insensitive to any further background pulses and remains in this state until a radiation pulse applied to terminal 20 again sets it back to state 4. In any state except 5 and 0 the circuit is sensitive to either radiation or background pulses, the former causing the circuit to fall back one state per pulse while the latter advances it one state per pulse. Outlet pulses are derived at terminal 22 for application to the scaler only after continued reception of radiation pulses when the circuit is in state 0.

Having generally outlined the sequence of operation and the function of the circuit, the operation thereof will now be described in detail. Assuming that the system is in state 5, that is with stages I, II and III each in their "0" condition, a negative radiation pulse applied at terminal 20 and coupled via capacitor 30 to the junction of resistor R2 and R3 switches stage I to the "1" condition thus setting the circuit back to state 4 of Fig. 5.

A second negative pulse applied to terminal 20 triggers stage I back to its "0" condition causing the anode of V2 to go negative. The resulting wave form is differentiated by capacitor 31 and applied to the control grid of tube V3 of stage II causing the latter to be switched to its "1" condition. A negative pulse from stage I is also applied via capacitor 32 to the grid of tube V6 of stage III, but the triggering effect thereof is canceled by a negative pulse applied to the grid of tube V5 via capacitor 33 from the anode of tube V4. Hence stage III remains in its "0" condition and the circuit is in state 3 of Fig. 5.

On the third radiation pulse to terminal 20, stage I is again switched to the "1" condition, but stages II and III are both in a condition such that the transition of stage I has no effect thereon and state 2 is produced.

On the fourth input pulse, stage I is again switched to the "0" condition producing a negative going wave form at the anode of tube V2 which is differentiated by capacitor 32 and applied to the control grid of V6 of stage II. Since stage II is in its "1" condition at this juncture, the transition of stage I has no effect thereon with the result that no cancellation pulse appears on the grid of tube V5 (as was the case on the second pulse) and stage III is switched to its "1" condition thus putting the system in state 1.

One more radiation pulse, the fifth, again switches stage I to the "1" condition and stages II and III being insensitive to the transition, the system is set back to its 0 and final state with all stages in the "1" condition.

In this condition, the anodes of tubes V1, V4 and V5 are at a relatively low potential whereby diodes 34, 35 and 36 which respectively connect their cathodes to point 37, are cut off, and diode 38 is rendered conducting. Consequently any further input pulse at terminal 20 is transmitted by diode 38 and through capacitor 39 to the grid of the tube V2 of stage I to cancel the effect of the same pulse applied via capacitor 30 to the junction of resistors R1 and R2 which tend to switch stage I back to its "0" condition. Therefore, considering only the effect of radiation pulses applied at terminal 20, the circuit locks in on state 0.

In addition to preventing further switching of stage I by pulses in excess of five, the conduction of diode 38 provides transmission of applied radiation pulses through capacitor 40 to output terminal 22 for application to the scaler. Thus, it is seen that every radiation pulse applied to terminal 20 produces an output pulse at terdinal 22 when, and only when, the system is in state 0.

The artificial background generator 12 appearing at the lower lefthand corner of Fig. 3 will be described in detail hereinbelow, but suffice it to say for the continued analysis of the background subtractor, that it provides at point 21 a series of equally spaced negative pulses at a repetition rate corresponding to the average rate of the background in the area in which the assay is being conducted. If, while the circuit is in state 0, that is with each of the stages in their "1" condition, a background pulse is received at point 21, it is transmitted by capacitor 41 to the junction of resistors R1 and R2 of stage I, switching the stage to the "0" condition. This first background pulse is also transmitted by capacitor 42 to the grid of tube V4 of stage II tending to return stage II to its "0" condition as well, but simultaneously a negative pulse from the anode of tube V2 of stage I is applied to the grid of tube V3 of stage II canceling the effect of the pulse on the grid of tube V4 so that stage II remains in the "1" condition. The grid of tube V5 of stage III also receives this background pulse via capacitor 43 but this too is canceled out by a pulse from the anode of tube V2 of stage I via capacitor 32. Thus, the first background pulse advances the circuit from state 0 to state 1.

A second background pulse applied at point 21 again switches stage I back to the "1" condition via capacitor 41, and being also applied to the grid of tube V5 of stage III via capacitor 43, switches stage III from the "1" to the "0" condition since there is no canceling pulse from stage I. The second background pulse is also applied to the grid of tube V4 of stage II but its effect is canceled by a negative pulse from the anode of tube V6 of stage III applied to the grid of tube V3 of stage II via capacitor 44 produced by the switching of stage III from the "1" to the "0" condition. Thus, stage II remains in the "1" condition, and the circuit is in state 2 as shown in Fig. 5.

A third background pulse again switches stage I to its "0" condition and again stage II is maintained at the "1" condition by a negative pulse from the anode of V2 of stage I applied to the control grid of tube V3 of stage II via capacitor 31 in spite of the application of the third background pulse to the grid of conducting tube V4 of stage II. Similarly, the attempt of the negative pulse generated at the anode of tube V2 of stage I to change stage III to the "1" condition via capacitor 32 is prevented by the background pulse itself being applied to the grid of V5 of stage III through capacitor 43. Thus, the circuit is in state 3 following the application of the third background pulse.

A fourth background pulse switches stage I from its "0" to its "1" condition and inasmuch as there are no effective canceling pulses produced in the operation, stage II is also switched from the "1" to the "0" condition. Stage III already being in the "0" condition at this time, the background pulse applied to the grid of tube V5 has no effect on this stage and, accordingly, the fourth background pulse places the circuit in state 4.

The fifth background pulse again switches stage I to its "0" condition producing a negative going voltage at the anode of tube V2. The attempt of the resulting pulse to reset stages II and III to their "1" condition via capacitors 31 and 32 is prevented by the simultaneous application of the applied background pulse to tubes V4 and V5 of stages II and III, respectively, whereby the latter stages remain in their "0" condition. After the application of five background pulses, then, the circuit is in state 5, with all stages in their "0" condition.

In this condition the anodes of diodes 45, 46 and 47 are connected to the low potential anodes of tubes V2, V3 and V6, which being lower than point 29, as has been described, permits diode 48 to conduct, thus cutting off the three diodes. Accordingly, any further background pulses applied to point 21 are transmitted by diode 48 and applied via capacitor 49 to the grid of tube V1 of stage I. These pulses maintain stage I in the "0" condition and the system locks in on state 5 so far as any more background pulses are concerned. Only a radiation pulse applied at terminal 20 can now change the condition of any of the stages in the circuit.

Briefly reviewing the foregoing description, with particular reference to Fig. 5, if the circuit is initially in state 5, six radiation pulses with no intervening background pulses must be applied at terminal 20 before the circuit provides an output pulse at terminal 22. Likewise five background pulses can be "stored" in the circuit for subsequent subtraction from the pulses applied at terminal 20. Considering a specific example, assume that the circuit is in state 4 and five radiation pulses are applied at terminal 20 followed by one background pulse, followed in turn, by four radiation pulses, and then followed by another background pulse. The first four of the first group of five radiation pulses are necessary to set the circuit back from state 4 to state 0 and the fifth produces an output pulse at terminal 22. The single background pulse which arrives next advances the circuit to state 1 so that the first of the next four radiation pulses is needed to again set the circuit back to state 0 with the result that three output pulses are produced in response to the second group of four. The next background pulse again advances the circuit to state 1 which much be overcome by the next radiation pulse before an output pulse is produced.

Returning now to the artificial background generator, circuit 12 may comprise any suitable pulse generator capable of operation over a range of repetition rates corresponding to the range of average background rates ordinarily encountered in radioassay work. The illustrated pulse generator is of the relaxation oscillator type, comprising a source of regulated voltage designated as terminal 50, a neon tube 51, a pentode 52, and resistor 53 connected in series and a capacitor 54 connected across neon tube 51. Tube 52 and resistor 53 affording a finite charging resistance, condenser 54 starts to charge towards the potential of the source and when the firing potential of the neon tube is reached, tube 51 conducts rapidly discharging capacitor 54. This action is repetitive resulting in a repetitive wave form being generated at the lower electrode of neon tube 51. The frequency of oscillation being dependent on the value of capacitor 54 and the charging resistance, the repetition rate may be adjusted by varying the effective resistance of tube 52. This is accomplished by changing the voltage applied to the control grid of the tube. A source of biasing voltage is provided by a voltage divider comprising resistors 55 and 53 connected in series between terminal 50 and ground. The control grid of the tube is connected to a movable tap on resistor 53, the changes in resistance of the tube being large in response to small changes in the potential applied to the grid. Thus, the repetition rate can be adjusted over a wide range by adjustment of knob 13 which controls the position of the movable tap on potentiometer 53. The positive output pulses of the oscillator are inverted by triode 56 to provide negative pulses for application to the background subtractor at point 21.

While the invention has been described as embodied in a six-state system having three bistable circuits, it will be understood that when less accurate results are desired, a register having less states may be used, and that when greater accuracy is necessary, a system having more states may be used. The six-state system was selected for description because of its adaptability to the conditions usually encountered in radioassay work.

As was mentioned earlier, the invention is not intended to be limited to the combination of the artificial "background" generator with the electronic register. In place of the pulse generator, the output of a separate detector, set up to measure only "background," may be applied to terminal 21, whereby actual background is continuously subtracted from the output of the assay detector to provide a net count corresponding to the activity of a sample under investigation. Actual "background" being randomly distributed, as distinguished from the evenly spaced pulse output of circuit 12, the plot of Fig. 1 of background pulses lost at different ratios of $R/B$ will be modified slightly, but it can be shown that the accuracy will be substantially the same.

It will also be readily apparent that the register of Fig. 3 may be used in other pulse counting applications than radioactive counting. For example, evenly distributed pulses from a suitable source may be applied to terminal 20 and evenly spaced pulses from another source may be applied to terminal 21. If the repetition rate of the pulses from the latter source is equal to or less than the rate of the former, the register is operative to subtract the pulses having the lower rate to provide a net counting rate exactly equal to their difference. Also, while the register has been described as applied to a counting operation wherein output pulses are provided only at terminal 22 when the circuit is in the "0" state, it will be readily apparent that another output terminal may be connected to point 29 whereby output pulses may be taken therefrom upon the continued receipt of "B" pulses when the circuit is in state 5. Thus, evenly spaced pulses of one repetition rate may be applied to terminal 20 and pulses of another rate may be applied to terminal 21, the register being effective to obtain the difference regardless of which is larger. If the rate of the pulses applied to terminal 20 is the higher, a net count equal to the difference will appear at terminal 22, and if the rate of the pulses applied to terminal 21 is the higher, a net count equal to the difference will appear at the terminal connected to point 29. So long as the pulses from each source are evenly spaced, there are no pulses lost in the operation and the subtraction is exact, and the register being entirely symmetrical, the accuracy of the net count when one series of pulses is random and the other regular is the same whether the output is derived at point 22 or at point 29, and the error is negligible when there is only a slight difference in the pulse rates of the two series.

Inasmuch as the term "background" has acquired a specific meaning in the art as those counts produced by factors other than the nuclear disintegrations of the radioactive sample being analyzed, such as cosmic radiation, slightly radioactive material in the counting area, and radioactive contamination of the material of the detector itself, it is used in that connection in the appended claims.

Various modifications, apart from those suggested and shown, may be made in the invention without departing from the spirit thereof and it is therefore intended that the invention not be limited to what has been shown and described except as such limitations occur in the appended claims.

What is claimed is:

1. Apparatus for the assay of a radioactive sample comprising, in combination, a radiation detector for producing randomly distributed pulses corresponding to the sum of the pulses attributable to said sample and the "background" of the detector, means generating evenly spaced pulses at a repetition rate equal to the average "background" rate of said detector, pulse subtraction means coupled to said detector and said pulse generating means for subtracting the output of said pulse generating means from the output of said detector and providing a series of output pulses having an average repetition rate corresponding to the average pulse rate attributable to said sample, and means for measuring said output pulses.

2. Apparatus for the assay of a radioactive sample comprising, in combination, a radiation detector for producing randomly distributed pulses corresponding to the sum of the pulses attributable to said sample and the "background" of the detector, a pulse generator generating evenly spaced pulses at a repetition rate equal to the independently determined average "background" rate of said detector, an electronic pulse subtraction register coupled to said detector and said pulse generator for subtracting the output of said pulse generator from the output of said detector and providing a series of output pulses having an average repetition rate corresponding to the average pulse rate attributable to said sample, and means connected to said register for measuring said output pulses.

3. Apparatus for the assay of a radioactive sample comprising, in combination, a radiation detector for producing randomly distributed pulses corresponding to the sum of the pulses attributable to said sample and the "background" of the detector, a variable frequency relaxation oscillator generating evenly spaced pulses at a repetition rate equal to the independently determined average "backgound" rate of said detector, a multiple-state electronic register coupled to said detector and said pulse generator for subtracting the output of said pulse generator from the output of said detector and providing a series of output pulses having an average repetition rate corresponding to the average pulse rate attributable to said sample, and means connected to said register for measuring said output pulses.

4. Apparatus for the assay of a radioactive sample comprising, in combination, a radiation detector of the pulse-producing type for producing randomly distributed pulses at a rate equal to the sum of the counting rate attributable to said sample and the "background" counting rate of said detector, a variable frequency oscillator adjustable to produce evenly spaced pulses at a repetition rate equal to the average "background" counting rate of said detector, an electronic register coupled to said detector and said oscillator, said register including a plurality of binary elements and having a plurality of distinct states, said register being advanced one state per pulse in response to pulses from said oscillator until a first predetermined state is reached and being reversed one state per pulse in response to pulses from said detector until a second predetermined state is reached, said register being arranged to produce output pulses in response to each pulse from said detector only when in said second predetermined state, and means connected to said register for measuring said output pulses.

5. Apparatus for the assay of a radioactive sample comprising, in combination, a radiation detector of the pulse-producing type for producing randomly distributed pulses at a rate equal to the sum of the counting rate attributable to said sample and the "background" counting rate of said detector, a variable frequency oscillator adjustable to produce evenly spaced pulses at a repetition rate equal to the average "background" counting rate of said detector, and electronic register coupled to said detector and said oscillator, said register including a plurality of binary stages interconnected to provide a plurality of distinct states, said register being advanced one state per pulse in response to pulses from said oscillator until a first predetermined state is reached at which the register in insensitive to further pulses from said oscillator and being reversed one state per pulse in response to pulses from said detector until a second predetermined state is reached, said register being arranged to produce output pulses in response to each pulse from said detector only when in said second predetermined state, and means connected to said register for counting output pulses.

6. Apparatus for the assay of a radioactive sample in the presence of "background" comprising, in combination, a first radiation detector for producing randomly distributed pulses at a rate equal to the sum of the counting rate attributable to said sample and the "background" counting rate, a second radiation detector for producing randomly distributed pulses at the "background" counting rate, an electronic register coupled to said first and second detectors, said register including a plurality of binary elements and having a plurality of distinct states, said register being arranged to be advanced one state per pulse in response to pulses from said second detector until a first predetermined state is reached and to be reversed one state per pulse in response to pulses from said first detector until a second predetermined state is reached, said register further being arranged to produce output pulses in response to each pulse from said first detector when and only when in said second predetermined state, and means connected to said register for measuring said output pulses.

7. Apparatus for the assay of a radioactive sample in the presence of "background" comprising, in combination, a radiation detector for producing randomly distributed pulses at a rate equal to the sum of the counting rate attributable to said sample and the "background" counting rate, a pulse generator for generating uniformly spaced pulses at a rate corresponding to the average "background" counting rate, an electronic register having first and second input terminals respectively connected to said pulse generator and said detector and including first, second, and third binary elements each having first and second conditions of stability to which it may be switched alternately by the proper application thereto of voltage impulses, said first input terminal being connected to said first, second and third binary elements and said second input terminal being connected to said first binary element, means interconnecting said binary elements arranged such that successive pulses from said pulse generator cause switching of said binary elements in sequence until all of said elements are in said first condition of stability, and successive pulses from said detector cause switching of said elements in reverse sequence until all of said elements are in said second condition of stability, means connected between said first input terminal and said first binary element and operative in response to the potentials at selected points of said binary elements when said elements are all in said first condition of stability to prevent further switching of said elements by pulses from said pulse generator, an output terminal, means connected between said second input terminal and said output terminal and operative in response to the potentials at other selected points in said binary elements when said elements are all in said second condition of stability to prevent further switching of said elements by pulses from said detector and to couple an output pulse to said output terminal for each pulse from said detector, and means connected to said output terminal for measuring said output pulses.

8. Apparatus for the assay of a radioactive sample in the presence of "background" comprising, in combination, a radiation detector for producing randomly distributed pulses at a rate equal to the sum of the counting rate attributable to said sample and the "background" counting rate, a pulse generator for generating uniformly spaced pulses at a rate corresponding to the average "background" counting rate, an electronic register including first, second and third trigger circuits each having first and second conditions of stability, said first trigger circuit having first, second and third terminals so arranged that negative pulses applied to said first terminal cause switching from either condition of stability to the other and negative pulses applied to said second and third terminals respectively cause switching from the first to the second and from the second to the first condition of stability, said second and third trigger circuits each having first and second terminals so arranged that negative pulses applied thereto respectively cause switching from the first to the second and from the second to the first condition of stability, separate means connecting said pulse generator to the first terminal of said first trigger circuit, the second terminal of said second trigger circuit, and the second terminal of said third trigger circuit, means connecting said detector to the first terminal of said first trigger circuit, means connecting said first trigger circuit to the first terminal of said second trigger circuit and the first terminal of said third trigger circuit and arranged to couple a negative pulse to said second and third trigger circuits when said first trigger circuit is switched from the second to the first condition of stability, means connecting said second trigger circuit to the second terminal of said third trigger circuit and arranged to couple a negative pulse to said third trigger circuit when said second trigger circuit is switched from the first to the second condition of stability, means connecting said third trigger circuit to the first terminal of said second trigger circuit and arranged to couple a negative pulse to said second trigger circuit when said third trigger circuit is switched from the second to the first condition of stability, means connected between said pulse generator and the third terminal of said first trigger circuit and operative when all of said trigger circuits are in said first condition of stability to prevent further switching of said trigger circuits by pulses from said pulse generator, an output terminal connected to the second terminal of said first trigger circuit, means connected between said detector and said output terminal and operative when all of said trigger circuits are in said second condition of stability to prevent further switching of said trigger circuits by pulses from said detector and to couple an output pulse to said output terminal for each pulse from said detector, and means connected to said output terminal for measuring and indicating said output pulses.

9. Apparatus for the assay of a radioactive sample in the presence of "background" comprising, in combination, a radiation detector for producing randomly distributed pulses at a rate equal to the sum of the counting rate attributable to said sample and the "background" counting rate, a pulse generator for generating uniformly spaced pulses at a rate corresponding to the average "background" counting rate, an electronic register including first, second and third trigger circuits each having first, and second conditions of stability, said first trigger circuit having first, second and third terminals so arranged that negative pulses applied to said first terminal cause switching from either condition of stability to the other and negative pulses applied to said second and third terminals respectively cause switching from the first to the second and from the second to the first condition of stability, said second and third trigger circuits each having first and second terminals so arranged that negative pulses applied thereto respectively cause switching from the first to the second and from the second to the first condition of stability, separate means connecting said pulse generator to the first terminal of said first trigger circuit, the second terminal of said second trigger circuit, and the second terminal of said third trigger circuit, means connecting said detector to the first terminal of said first trigger circuit, means connecting said first trigger circuit to the first terminal of said second trigger circuit and the first terminal of said third trigger circuit and arranged to couple a negative pulse to said second and third trigger circuits when said first trigger circuit is switched from the second to the first condition of stability, means connecting said second trigger circuit to the second terminal of said third trigger circuit and arranged to couple a negative pulse to said third trigger circuit when said second trigger circuit is switched from the first to the second condition of stability, means connecting said third trigger circuit to the first terminal of said second trigger circuit and arranged to couple a negative pulse to said second trigger circuit when said third trigger circuit is switched from the second to the first condition of stability, means connected between said pulse generator and the third terminal of said first trigger circuit and operative in response to the potentials at selected points in all of said trigger circuits when all of said trigger circuits are in said first condition of stability to prevent further switching of said trigger circuits by pulses from said pulse generator, an output terminal connected to the second terminal of said first trigger circuit, means connected between said detector and said output terminal and operative in response to the potentials at other selected points in all of said trigger circuits when all of said trigger circuits are in said second condition of stability to prevent further switching of said trigger circuits by pulses from said detector and to provide an output pulse at said output terminal for each pulse from said detector, and means connected to said output terminal for measuring and indicating said output pulses.

10. Apparatus for the assay of a radioactive sample in the presence of "background" comprising, in combination, a radiation detector for producing randomly distributed pulses at a rate equal to the sum of the counting rate attributable to said sample and the "background" counting rate, a pulse generator for generating uniformly spaced pulses at a rate corresponding to the average "background" counting rate, an electronic register including first, second and third trigger circuits each having first, and second conditions of stability, said first trigger circuit having first, second and third terminals so arranged that negative pulses applied to said first terminal cause switching from either condition of stability to the other and negative pulses applied to said second and third terminals respectively cause switching from the first to the second and from the second to the first condition of stability, said second and third trigger circuits each having first and second terminals so arranged that negative pulses applied thereto respectively cause switching from the first to the second and from the second to the first condition of stability, separate means connecting said pulse generator to the first terminal of said first trigger circuit, the second terminal of said second trigger circuit, and the second terminal of said third trigger circuit, means connecting said detector to the first terminal of said first trigger circuit, means connecting said first trigger circuit to the first terminal of said second trigger circuit and the first terminal of said third trigger circuit and arranged to couple a negative pulse to said second and third trigger circuits when said first trigger circuit is switched from the second to the first condition of stability, means connecting said second trigger circuit to the second terminal of said third trigger circuit and arranged to couple a negative pulse to said third trigger circuit when said second trigger circuit is switched from the first to the second condition of stability, means connecting said third trigger circuit to the first terminal of said second trigger circuit and arranged to couple a negative pulse to said second trigger circuit when said third trigger circuit is switched from the second to the first condition of stability, a first diode connected between said pulse generator and the third terminal of said first trigger circuit and rendered conductive in response to the potentials at selected points in all of said trigger circuits when all of said trigger circuits are in said first condition of stability to prevent further switching of said trigger circuits by pulses from said pulse generator, an output terminal connected to the second terminal of said first trigger circuit, a second diode connected between said detector and said output terminal and rendered conductive in response to the potentials at other selected points in all of said trigger circuits when all of said trigger circuits are in said second condition of stability to prevent further switching of said trigger circuits by pulses from said detector and to couple an output pulse to said output terminal for each pulse from said detector, and means connected to said output terminal for measuring and indicating said output pulses.

11. In radioassay apparatus including a pulse producing detector having an inherent "background" counting rate, apparatus for subtracting the "background" from the output of said detector comprising, in combination, a pulse generator generating evenly spaced pulses at a repetition rate equal to the independently determined average "background" counting rate of said detector, and an electronic register to which the outputs of said detector and said pulse generator are applied, said register including a plurality of interconnected bistable elements providing a plurality of distinct states, said register being advanced one state per pulse in response to pulses from said pulse generator until a first predetermined state is reached in which the register is insensitive to further pulses from said generator and being reversed one state per pulse in response to pulses from said detector until a second predetermined state is reached, said register being arranged to produce output pulses in response to each pulse from said detector when and only when in said second state.

12. In radioassay apparatus including a pulse-producing detector having an inherent "background" counting rate and a pulse counting means, means interposed between said detector and said counting means for subtracting the "background" from the pulse output of said detector prior to application thereof to said counting means comprising, an electronic register having a first input terminal to which said detector is connected, a second input terminal, and an output terminal and including a plurality of bistable elements providing a plurality of distinct states, a variable repetition rate pulse generator coupled to said second terminal for generating evenly spaced pulses at a repetition rate corresponding to the average "background" counting rate of said detector, said register being arranged to be advanced one state per pulse in response to pulses from said pulse generator until a first predetermined state is reached in which the register is insensitive to further pulses from said pulse generator and to be reversed one state per pulse in response to pulses from said detector until a second predetermined state is reached in which an output pulse is produced at said output terminal for each pulse applied to said first input terminal, whereby pulse counting means connected to said output terminal indicates a counting rate which does not include "background."

13. In combination, a first source of randomly distributed pulses, a second source of evenly spaced pulses, and means connected to said first and second pulse sources for deriving a net average output pulse rate equal to the difference between the average pulse rates of said first and second sources, said means comprising a register circuit including a plurality of binary stages providing a plurality of distinct states, means interconnecting said stages and so arranged that said states are successively assumed in a forward direction one state per pulse in response to pulses from said second source, means connected to said stages and operative in response to the potentials at selected points of said stage when a first predetermined state is reached to prevent further state changes in said register by pulses from said second source, said interconnecting means further providing successive assumption of said states in a reverse direction one state per pulse in response to pulses from said first source, and means connected to said stages and operative in response to the potentials at other selected points of said stage when a second predetermined state is reached to prevent further state changes in said register by pulses from said first source, and to provide an output pulse for each input pulse from said first source.

14. In combination, a first source of randomly distributed pulses, a second source of evenly distributed pulses, and means connected to said first and second pulse sources for deriving a net average output pulse rate equal to the difference between the average pulse rates of said first and second sources, said means comprising an electronic register including a plurality of trigger circuits each having two conditions of conductivity interconnected to provide a number of distinct conduction states in said register, said trigger circuits being switched in response to pulses from said second source in a sequence such that said register is advanced one state per pulse until a first state is reached in which further pulses from said first source do not switch said trigger circuits, said trigger circuits being arranged to be switched in response to pulses from said first source in reverse sequence to that produced by pulses from said second source to reverse said register one state per pulse, and means including a plurality of diodes interconnecting said trigger circuits arranged to prevent switching of said trigger circuits by pulses from said first source after a second state is reached and to provide an output pulse for each pulse from said first source.

15. An electronic register comprising a plurality of bistable elements each having first and second conditions of stability to which it may be switched from one condition to the other in response to pulses applied thereto, a first input terminal coupled to one of said elements, a second input terminal coupled to all of said elements, means interconnecting said elements arranged to provide sequential switching thereof to provide a plurality of distinct states as determined by the condition of stability of said elements, said interconnecting means causing said register to be advanced one state per pulse in response to pulses applied to said first input terminal until the condition of stability of said elements determines a first state, and to be reversed one state per pulse in response to pulses applied to said second input terminal until the condition of stability of said elements determines a second state, means connected between said first input terminal and one of said elements and operative in response to the potentials at selected points of said elements when determining said first state to prevent further switching of said elements by pulses applied to said first input terminal, an output terminal, and means connected between said second input terminal and said output terminal and operative in response to the potentials at selected other points of said elements when determining said second state to prevent further switching of said elements by pulses applied to said second input terminal and to couple an output pulse to said output terminal for each pulse applied to said second input terminal.

16. An electronic register comprising, in combination, first, second and third trigger stages each having first and second conditions of stability to which it may be switched alternately by the proper application thereto of negative voltage pulses and each including first and second electron tubes each having an anode, a cathode and a control grid, a first input terminal to which pulses from a first source may be applied coupled to said first, second and third stages, a second input terminal to which pulses from a second source may be applied coupled to said first stage, means interconnecting said first, second and third stages arranged such that successive input pulses applied to said first input terminal causes switching of said stages in sequence until all of said stages are in said first condition of stability and successive input pulses applied to said second input terminal cause switching of said stages in reverse sequence until all of said stages are in said second condition of stability, means connected between said first input terminal and the control grid of the first tube of said first stage and operative in response to the potentials at selected points of said first, second and third stages when said stages are all in said first condition of stability to prevent further switching of said stages by pulses applied to said first input terminal, an output terminal, and means connected between said second input terminal and said output terminal and operative in response to the potentials at other selected points of said first, second and third stages when said stages are all in said second condition of stability to prevent further switching of said stages by pulses applied to said second input terminal and to couple an output pulse to said output terminal for each pulse applied to said second input terminal.

17. An electronic register comprising, in combination, first, second and third trigger circuits each having first and second conditions of stability, said first trigger circuit having first, second and third terminals so arranged that negative pulses applied to said first terminal cause switching from either condition of stability to the other and negative pulses applied to said second and third terminals respectively cause switching from the first to the second and from the second to the first condition of stability, said second and third trigger circuits each having first and second terminals so arranged that negative pulses applied thereto respectively cause switching from the first to the second and from the second to the first condition of stability, means for coupling negative pulses from a first source to the first terminal of said first trigger circuit, the second terminal of said second trigger circuit, and the second terminal of said third trigger circuit, means for coupling negative pulses from a second source to the first terminal of said first trigger circuit, means connecting said first trigger circuit to the first terminal of said second trigger circuit and the first terminal of said third trigger circuit and arranged to couple a negative pulse to said second and third trigger circuits when said first trigger circuit is switched from the second to the first condition of stability, means connecting said second trigger circuit to the second terminal of said third trigger circuit arranged to couple a negative pulse to said third trigger circuit when said second trigger circuit is switched from the first to the second condition of stability, means connecting said third trigger circuit to the first terminal of said second trigger circuit and arranged to couple a negative pulse to said second trigger circuit when said third trigger circuit is switched from the second to the first condition of stability, means connected to the third terminal of said first trigger circuit and operative when all of said trigger circuits are in said first condition of stability to prevent further switching of said trigger circuits by pulses from said first source, an output terminal connected to the second terminal of said first trigger circuit, and means connected to said output terminal and operative when all of said trigger circuits are in said second condition of stability to prevent further switching of said trigger circuits by pulses from said second source and to provide an output pulse at said output terminal for each pulse from said second source.

18. An electronic register comprising, in combination, first, second and third trigger circuits each having first and second conditions of stability, said first trigger circuit having first, second and third terminals so arranged that negative pulses applied to said first terminal cause switching from either condition of stability to the other and negative pulses applied to said second and third terminals respectively cause switching from the first to the second and from the second to the first condition of stability, said second and third trigger circuits each having first and second terminals so arranged that negative pulses applied thereto respectively cause switching from the first to the second and from the second to the first condition of stability, means for coupling negative pulses from a first source to the first terminal of said first trigger circuit, the second terminal of said second trigger circuit, and the second terminal of said third trigger circuit, means for coupling negative pulses from a second source to the first terminal of said first trigger circuit, means connecting said first trigger circuit to the first terminal of said second trigger circuit and the first terminal of said third trigger circuit and arranged to couple a negative pulse to said second and third trigger circuits when said first trigger circuit is switched from the second to the first condition of stability, means connecting said second trigger circuit to the second terminal of said third trigger circuit arranged to couple a negative pulse to said third trigger circuit when said second trigger circuit is switched from the first to the second condition of stability, means connecting said third trigger circuit to the first terminal of said second trigger circuit and arranged to couple a negative pulse to said second trigger circuit when said third trigger circuit is switched from the second to the first condition of stability, a first diode connected to the third terminal of said first trigger circuit and conductive in response to the potentials at selected points in all of said trigger circuits only when all of said trigger circuits are in said first condition of stability to prevent further switching of said trigger circuits by pulses from said first source, an output terminal connected to the second terminal of said first trigger circuit, and a second diode connected to said output terminal and conductive in response to the potentials at other selected points in all of said trigger circuits only when all of said trigger circuits are in said second condition of stability to prevent further switching of said trigger circuits by pulses from said second source and to provide an output pulse at said output terminal for each pulse from said second source.

19. In combination, a radiation detector for producing distributed pulses at a rate corresponding to the sum of the pulses attributable to a radioactive sample and the inherent "background" of the detector, means generating spaced pulses at a repetition rate equal to the average "background" rate of said detector, and pulse subtraction means coupled to said detector and said pulse generating means for subtracting the output of said pulse generating means from the output of said detector to produce output pulses at a rate attributable only to said sample, and means for measuring said output pulses.

20. Apparatus for the assay of a radioactive sample comprising, in combination, a radiation detector of the pulse-producing type for producing randomly distributed pulses at a rate equal to the sum of the counting rate attributable to said sample and the "background" counting rate of said detector, a variable frequency oscillator adjustable to produce evenly spaced pulses at a repetition rate equal to the average "background" counting rate of said detector, a multiple state electronic register coupled to said detector and to said oscillator and arranged to subtract the output of said oscillator from the output of said detector to provide a series of output pulses having an average repetition rate corresponding to the average pulse rate attributable to said sample, and means connected to said register and arranged to measure said output pulses.

References Cited in the file of this patent

UNITED STATES PATENTS

| | | |
|---|---|---|
| 2,560,172 | Jones | July 10, 1951 |
| 2,648,015 | Greenfield | Aug. 4, 1953 |
| 2,653,248 | Perlow et al. | Sept. 22, 1953 |
| 2,659,011 | Youmans | Nov. 10, 1953 |
| 2,685,027 | Alvarez | July 27, 1954 |